(12) United States Patent  
Ishida et al.

(10) Patent No.: US 9,357,020 B2  
(45) Date of Patent: May 31, 2016

(54) INFORMATION SOURCE SELECTION SYSTEM, INFORMATION SOURCE SELECTION METHOD, AND PROGRAM

(71) Applicant: Sony Computer Entertainment Inc., Tokyo (JP)

(72) Inventors: Takayuki Ishida, Tokyo (JP); Osamu Ota, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 496 days.

(21) Appl. No.: 13/714,757

(22) Filed: Dec. 14, 2012

(65) Prior Publication Data

US 2013/0173707 A1 Jul. 4, 2013

(30) Foreign Application Priority Data

Dec. 29, 2011 (JP) ................................. 2011-290327

(51) Int. Cl.
  *G06F 15/16* (2006.01)
  *H04L 29/08* (2006.01)

(52) U.S. Cl.
  CPC ............ *H04L 67/22* (2013.01); *H04L 67/2838* (2013.01)

(58) Field of Classification Search
  USPC .......................... 709/204; 705/14.53; 707/736
  See application file for complete search history.

(56) References Cited

U.S. PATENT DOCUMENTS 8,359,313 B2 * 1/2013 Mui ..................... G06F 17/3089
  707/736
9,003,012 B2 * 4/2015 Balasubra-
  manian ............... H04L 12/2602
  709/224

(Continued)

FOREIGN PATENT DOCUMENTS

CN   1203399 A   12/1998
CN   101174274 A   5/2008

(Continued)

OTHER PUBLICATIONS

Office Action for corresponding Japanese Patent Application No. 2011-290327, dated Aug. 6, 2013.
Partial translation of an Office Action issued for corresponding Japanese Patent Application No. 2011-290327, dated Oct. 29, 2013.
Office Action issued for corresponding Chinese Patent Application No. 201210585009.4, dated Aug. 6, 2015.

*Primary Examiner* — Tammy Nguyen
(74) *Attorney, Agent, or Firm* — Michael B. Dernier, Esq.

(57) ABSTRACT

An information source selection system and an information source selection method for allowing a user to easily select an information source to which information is added at a frequency that matches the user's access frequency are provided. The method includes acquiring information on information addition frequency, which indicates frequency at which information is added per predetermined time period, for each of a plurality of recommendation candidate information sources contained in a plurality of information sources provided on a communication network, acquiring access frequency information that indicates frequency at which a user accesses one of the plurality of information sources provided on the communication network, and selecting, from the plurality of the recommendation candidate information sources, one or more recommendation candidate information sources that match the user based on the information on information addition frequency of each of the recommendation candidate information sources and the access frequency information of the user.

8 Claims, 10 Drawing Sheets

(56) References Cited

U.S. PATENT DOCUMENTS

| | | |
|---|---|---|
| 9,143,572 B2 | 9/2015 | Donovan |
| 2006/0075019 A1 | 4/2006 | Donovan |
| 2009/0265460 A1* | 10/2009 | Balasubramanian .................. H04L 12/2602 709/224 |
| 2011/0093461 A1* | 4/2011 | Mui .................... G06F 17/3089 707/736 |
| 2011/0208585 A1* | 8/2011 | Daboll .................. G06Q 10/00 705/14.53 |

FOREIGN PATENT DOCUMENTS

| | | |
|---|---|---|
| CN | 101432713 A | 5/2009 |
| EP | 1918831 A1 | 5/2008 |
| JP | 2001159997 A | 6/2001 |
| JP | 2001283101 A | 10/2001 |

* cited by examiner

FIG.3

22a — XYZ NEWS
10/20/2011 10:13 AM
10/20/2011 11:01 AM

FIG.4

| INFORMATION TYPE | RECOMMENDA-TION CANDIDATE ID | URL |
|---|---|---|
| NEWS | N-001<br>N-002<br>N-003<br>N-004<br>N-005 | http://www.news001.com/<br>http://www.news002.jp/, http://www.news.jp/<br>http://www.news003.co.jp/<br>http://www.news004.com/<br>http://www.news005.jp/ |
| ENTERTAINMENT | E-001<br>E-002<br>E-003<br>E-004<br>E-005<br>E-006 | http://www.entertainment001.com/<br>http://www.entertainment002.com/<br>http://www.entertainment003.com/<br>http://www.entertainment004.jp/<br>http://www.entertainment005.jp/<br>http://www.entertainment006.com/ |
| SPORTS | S-001<br>S-002<br>S-003 | http://www.sports001.com/<br>http://www.sports002.com/<br>http://www.sports003.com/ |

| RECOMMENDA-TION CANDIDATE ID | A MINUTE | AN HOUR | A DAY | A WEEK | UPDATE TYPE | INFORMATION ADDITION RATE |
|---|---|---|---|---|---|---|
| N-001 | 1 | 59 | 708 | 5000 | EVERY MINUTE | 1/MINUTE |
| N-002 | 0 | 18 | 220 | 1500 | EVERY HOUR | 18/HOUR |
| N-003 | 0 | 1 | 49 | 350 | EVERY DAY | 49/DAY |
| N-004 | 0 | 0 | 0 | 100 | EVERY WEEK | 100/WEEK |
| N-005 | 0 | 0 | 23 | 160 | EVERY DAY | 23/DAY |

FIG.7

| INFORMATION TYPE | KEYWORD | ACCESS DATE AND TIME (ACCESS PERIOD) | ACCESS TYPE | INFORMATION ACQUISITION RATE |
|---|---|---|---|---|
| NEWS | ECONOMY, STOCK, PRODUCT, SERVICE, COMPANY... | 12/1/2011-10:30(6) 12/1/2011-11:20(6) ...... | EVERY HOUR | 15/HOUR |
| ENTERTAINMENT | MUSIC, SONG, TV, MOVIE, ACTOR/ACTRESS... | 12/1/2011-10:45(3) 12/2/2011-12:01(2) ...... | EVERY DAY | 40/DAY |
| SPORTS | BASEBALL, GOLF, ACTOR/ACTRESS, BASKETBALL... | 11/25/2011-9:20(5) 12/2/2011-10:30(6) ...... | EVERY WEEK | 80/WEEK |

FIG.8

| USER ID | NEWS | | ENTERTAINMENT | | SPORTS | |
|---|---|---|---|---|---|---|
| | ACCESS TYPE | INFORMATION ACQUISITION RATE | ACCESS TYPE | INFORMATION ACQUISITION RATE | ACCESS TYPE | INFORMATION ACQUISITION RATE |
| U001 | EVERY HOUR | 15/HOUR | EVERY DAY | 40/DAY | EVERY WEEK | 80/WEEK |
| U002 | EVERY DAY | 30/DAY | EVERY DAY | 20/DAY | EVERY WEEK | 60/WEEK |
| U003 | EVERY MINUTE | 15/MINUTE | EVERY WEEK | 70/WEEK | EVERY DAY | 15/DAY |

INFORMATION SOURCE SELECTION SYSTEM, INFORMATION SOURCE SELECTION METHOD, AND PROGRAM

CROSS-REFERENCE TO RELATED APPLICATION

The present application claims priority from Japanese application JP 2011-290327 filed on Dec. 29, 2011, the content of which is hereby incorporated by reference into this application.

TECHNICAL FIELD

The present invention relates to an information source selection system, an information source selection method, and a program.

BACKGROUND ART

With the widespread use of the Internet, new types of information sources, such as Wikipedia (trademark) and Twitter (trademark), have appeared one after another. Among these information sources, Internet users select and access information that matches their preference so as to obtain desired information.

SUMMARY

Some Internet users may access Internet sites as information sources every day to check if new information is available, while others may access the Internet sites only once per week or so. On the other hand, among various information sources, some information sources may be frequently uploaded with new information items in a fragmented manner, such as real-time news. Other information sources may be infrequently uploaded with new information items, but are uploaded with the information items in a collective manner, such as weekly news. In the latter case, even though a user accesses the information sources frequently, new information has often not been uploaded, and thus the user's frequent accesses end up fruitless most of the time. In addition, in the former case, if a user rarely accesses the information sources, the user cannot understand the current situation unless they look through vast amounts of past information which is fragmented.

One or more embodiments of the present invention have been conceived in view of the above, and an object thereof is to provide a system for selecting an information source, a method for selecting an information source, and a program for allowing a user to easily select an information source to which information is added at a frequency that matches the user's access frequency to the information source.

In order to solve the above described problems, an information source selection system according to an embodiment of the present invention includes: a unit configured to acquire information on information addition frequency, which indicates frequency at which information is added per predetermined time period, for each of a plurality of recommendation candidate information sources contained in a plurality of information sources provided on a communication network; a unit configured to acquire access frequency information that indicates the frequency at which a user accesses one of the plurality of information sources provided on the communication network; and a unit configured to select, from the plurality of recommendation candidate information sources, one or more recommendation candidate information sources that match the user based on the information on information addition frequency of each of the recommendation candidate information sources and the access frequency information of the user.

The access frequency information may be acquired for each information type. Further, the one or more recommendation candidate information sources that match the user may be selected from (based on the access frequency information that corresponds to a type of given information) the recommendation candidate information sources that provide the type of given information.

The information source selection system may further include a unit configured to acquire information on an amount of information that the user acquires per predetermined time period. In this case, the one or more recommendation candidate information sources that match the user may be selected based on the acquired amount of information.

An information source selection method according to an embodiment of the present invention includes: acquiring information on information addition frequency (which indicates the frequency at which information is added per predetermined time period, for each of a plurality of recommendation candidate information sources contained in a plurality of information sources provided on a communication network); acquiring access frequency information that indicates frequency at which a user accesses one of the plurality of information sources provided on the communication network, and selecting, from the plurality of the recommendation candidate information sources, one or more recommendation candidate information sources that match the user based on the information on information addition frequency of each of the recommendation candidate information sources and the access frequency information of the user.

A program according to an embodiment includes: acquiring information on information addition frequency (which indicates the frequency at which information is added per predetermined time period) for each of a plurality of recommendation candidate information sources contained in a plurality of information sources provided on a communication network; acquiring access frequency information that indicates the frequency at which a user accesses one of the plurality of information sources provided on the communication network; and selecting, from the plurality of the recommendation candidate information sources, one or more recommendation candidate information sources that match the user based on the information on information addition frequency of each of the recommendation candidate information sources and the access frequency information of the user.

An information storage medium according to the embodiment of the present invention is a computer readable information storage medium for storing the program mentioned above.

DETAILED DESCRIPTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

An embodiment of the present invention will be described below in detail with reference to the accompanying drawings.

Figure 1:
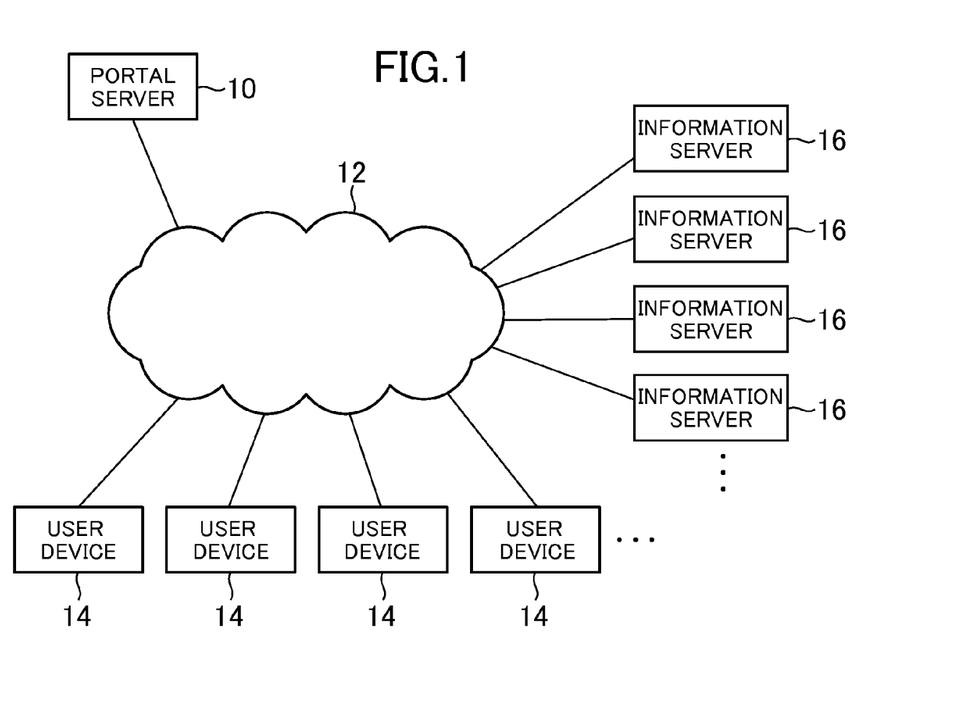
FIG. 1 is a diagram illustrating the overall configuration of a computer network including an information source selection system according to an embodiment of the present invention.

FIG. 1 is a diagram illustrating an overall configuration of a computer network including an information source selection system according to an embodiment of the present invention. As shown in FIG. 1, the computer network includes a portal server 10 connected to a data communication network 12, such as the Internet, a plurality of user devices 14, and a plurality of information servers 16.

The portal server 10 is an embodiment of the information source selection system according to the present disclosure and is a web server configured to include a server computer. The information servers 16 are configured to each include a server computer and are web servers that send information in response to an access from a web browser. A general user may upload information to be stored in the information servers 16 from the user device 14 or other computers, or an operator of the web server may operate the information servers 16 or other computers to store information in the information server 16.

The information servers 16 may be configured as, for example, a news site to provide information registered by the operator or a message board to distribute information posted by users. The information servers 16 include a type of server to which information is stored every time new information is generated, and a type of server to which information is periodically stored at various intervals, e.g., every hour, day, or week.

The user devices 14 are computers used by users and include, for example, a personal computer, a consumer game machine, a portable game machine, a mobile phone a smartphone, etc. The user devices 14 are installed with a web browser program. The user can access the portal server or the information servers 16 using the web browser.

Figure 2:
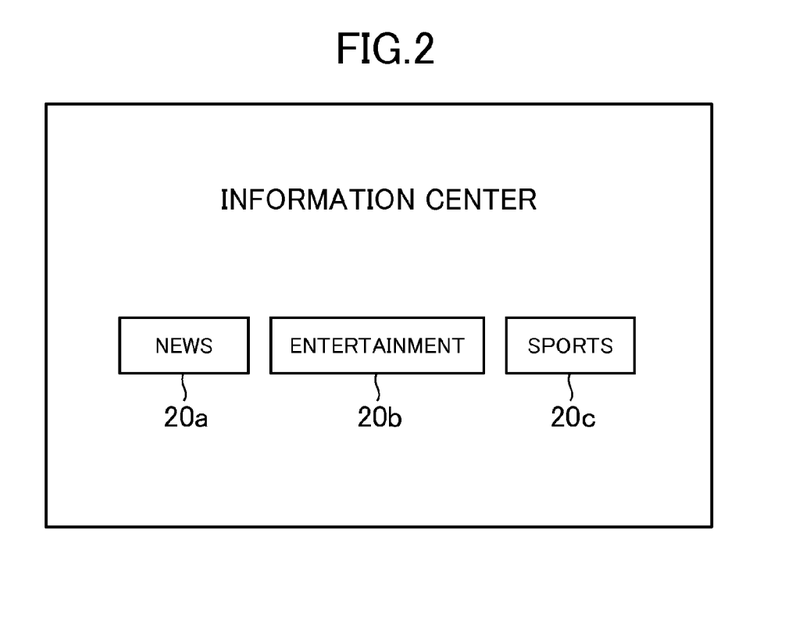
FIG. 2 is a diagram illustrating an example of an information type selection screen displayed on a user device.

FIG. 2 illustrates an example of an information type selection screen returned from the portal server 10 upon an access from the user device 14. The information type selection screen is displayed on the user device 14 based on HTML data sent from the portal server 10.

As shown in FIG. 2, the information type selection screen includes a plurality of information type buttons 20a, 20b, and 20c. When a user selects any of the buttons using a pointing device, such as a mouse or a touch panel, information corresponding to the selected button is displayed on the user device 14. In particular, the portal server 10 returns to the user device 14 a URL (Uniform Resource Locator) of an information source corresponding to the selected button. The user device 14 then receives, from any of the information servers 16, the HTML data identified by the received URL, and displays the HTML data.

Figure 3:
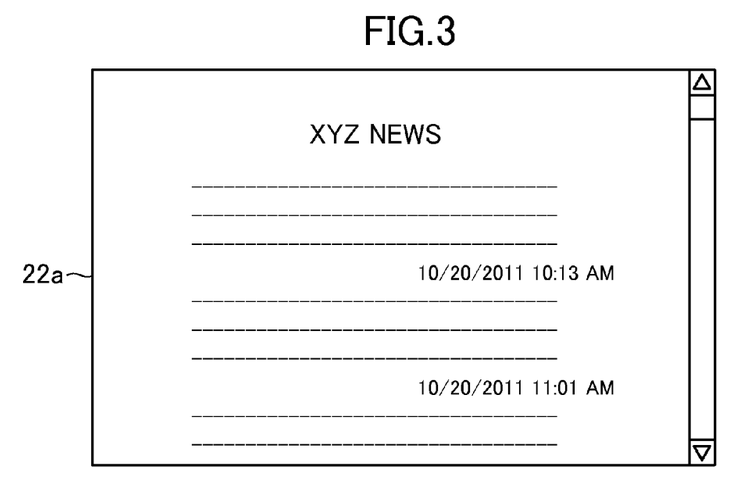
FIG. 3 is a diagram illustrating an example of an information screen displayed on the user device.

Instead of returning the URL to the user device 14, the portal server 10 itself may receive the HTML data from the information source of the URL and transfer the received HTML data to the user device 14. FIG. 3 illustrates an example of an information screen displayed on the user device 14 when the user selects the information type button 20a on the information type selection screen. The information screen 22a is also displayed on the user device 14 based on HTML data that is sent from the information server 16 or transferred from the portal server 10.

A feature of the present embodiment is that the portal server recognizes an update frequency of information for each information source based on processing for searching information sources (FIG. 9) and processing for updating the information addition frequency table (FIG. 10), both described later. Another feature of the present embodiment is that the user device 14 recognizes a user's access frequency to each information source based on processing for recording an access management table (FIG. 11) and processing for determining an access type (FIG. 12), both described later.

The portal server 10 then returns to the user device 14 information regarding a URL of an information source to which information is added at a frequency that matches the user's access frequency or information on the information source of the URL, based on processing for selecting an information source (FIG. 13) (described later). This allows a user to obtain necessary information from an information source to which information is added at a frequency that matches their access frequency. For example, a user who frequently accesses information sources is notified of a URL of an information source to which new information is added frequently. On the other hand, a user who rarely accesses information sources is notified of a URL of an information source to which new information is added rarely.

In the following, information processing executed on the portal server 10 will be described in detail.

Figure 4:
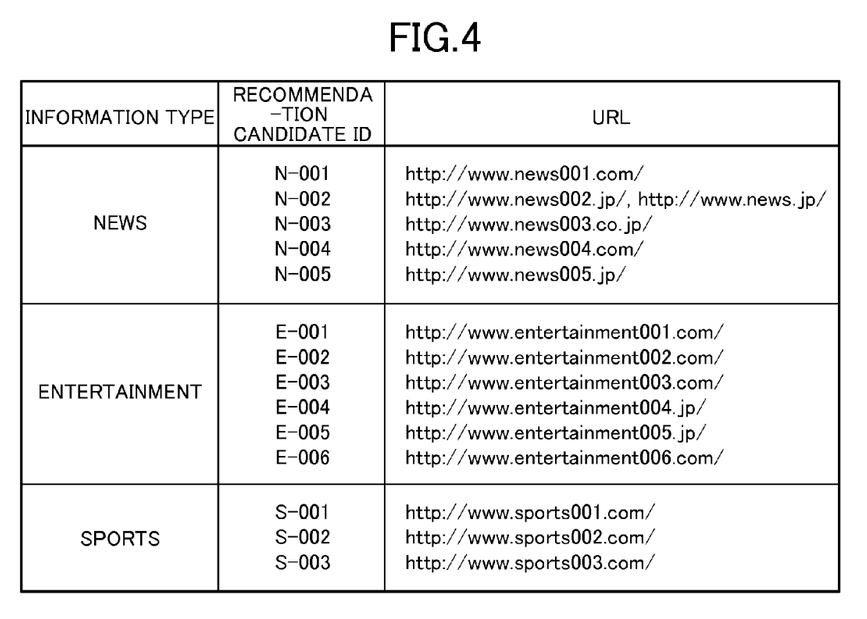
FIG. 4 is a diagram illustrating an example of a list of recommendation candidate information sources stored in a portal server.

FIG. 4 illustrates a list of recommendation candidate information sources stored in the portal server 10. As shown in FIG. 4, the list of recommendation candidate information sources includes information on a plurality of information sources, which are recommendation candidates, categorized into types of information, e.g., news, entertainment, or sports. Information about each information source includes a recommendation candidate ID that specifies the information source and a URL of the information source. The list of recommendation candidate information sources is a list of information sources that are candidates selected from a large number of information sources built on any of the information servers 16 so as to be recommended to each user, and is created manually by, for example, an operator of the portal server 10.

Figure 5:
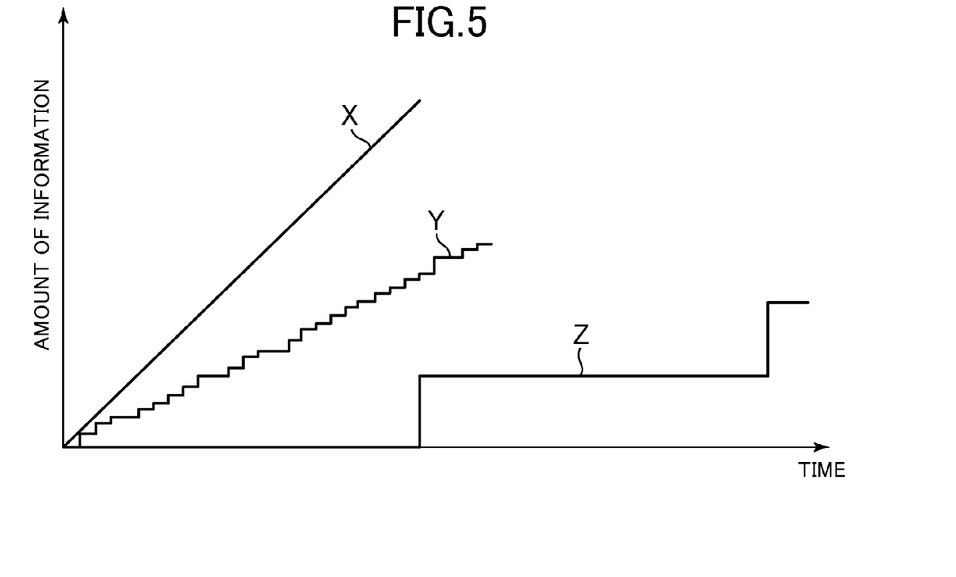
FIG. 5 is a diagram schematically illustrating a difference in frequency at which new information is added to each of the information sources.

The information sources of these recommendation candidates are added with information by the operator or the user, as described above, however there is no pattern to frequency of adding information. FIG. 5 schematically illustrates that there is a difference in frequency in which new information is added to each of the information sources. As shown by line X in FIG. 5, some information sources frequently add small amounts of new data. Other information sources, as shown by line Z, add large amounts of new information, but do so on an infrequent basis. Additionally, as shown by line Y, some information sources add an intermediate amount of new information at an intermediate frequency.

Figure 6:
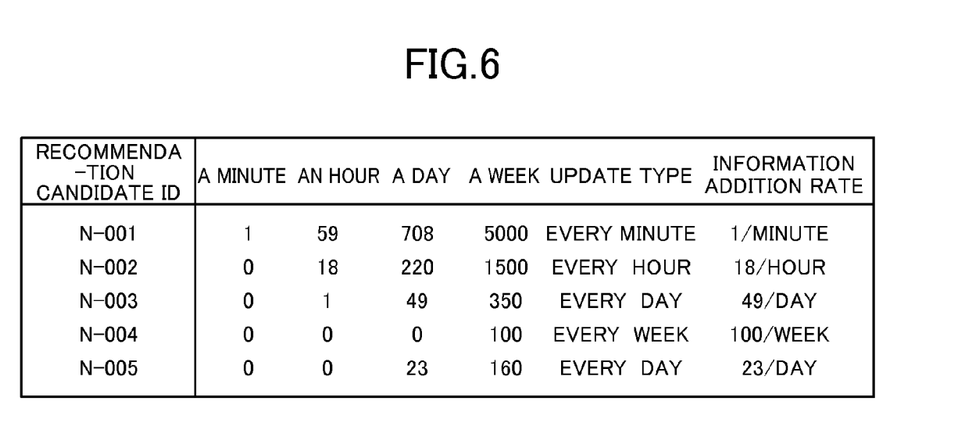
FIG. 6 is a diagram illustrating an example of an information addition frequency table stored in the portal server.

The portal server 10 measures, for each of the information sources as a recommendation candidate, the frequency at which new information is added and an information addition rate. The portal server 10 then stores the gathered information with respect to the information addition frequency and the information addition rate. FIG. 6 illustrates an example of an information addition frequency table stored in the portal server 10. As shown in FIG. 6, the information addition frequency table includes, for each of the recommendation candidate IDs, information regarding how much new information is added to an information source specified by each ID per minute, hour, day, or week, respectively.

In addition, the information addition frequency table includes a type of update that is determined based on the above mentioned information and an amount of new information added per unit of time (information addition rate). In FIG. 6, there is illustrated an information addition frequency table of a type of information on "news". Similarly, information addition frequency tables of other types of information are stored in the portal server. In this table, the update type suggests a frequency at which information is added to an information source, and is an embodiment of information addition frequency information according to the present disclosure.

In FIG. 6, an information source of N-001 adds 1 given amount of new information per minute, 59 given amounts of new information per hour, 708 given amounts of new information per day, and 5000 given amounts of new information per week. Here, 1 given amount of information is, for example, 300 bytes. In this case, n given amounts of information is n×300 bytes.

If 1 given amount of information continues to be added per minute, it can be assumed that about 60 times that amount of information per minute is added per hour. In addition, it can be assumed that about 12 times the amount of information per hour (daytime) is added in a day. It can be also assumed that about 7 times the amount of information per day is added in a week.

In this embodiment, if the amount of information added in a week is greater than or equal to a predetermined number of times (e.g., 21 times) of the amount of information added in a day, the type of update is classified as an "every week" type. At this time, a value of the information addition rate is the same as a value of the amount of information added in a week contained in the information addition frequency table.

If the amount of information added in a week is less than a predetermined number of times (e.g., 21 times) of the amount of information added in a day, the type of update is classified as an "every day" type. At this time, a value of the information addition rate is the same as a value of the amount of information added in a day contained in the information addition frequency table.

If the amount of information added in a day is less than a predetermined number of times (e.g., 36 times) of the amount of information added in an hour, the type of update is classified as an "every hour" type. At this time, a value of the information addition rate is the same as a value of the amount of information added in an hour contained in the information addition frequency table.

If the amount of information added in an hour is less than a predetermined number of times (e.g., 180 times) of the amount of information added in a minute, the type of update is classified as an "every minute" type. At this time, a value of the information addition rate is the same as a value of the amount of information added in a minute contained in the information addition frequency table.

In view of the above mentioned conditions, update frequency of the information source N-001 applies to "everyday" type, update frequency of N-002 applies to "every hour" type, N-003 and N-005 apply to "every day" type, and N-004 applies to "every week" type.

In this way, the portal server 10 generates information regarding information addition frequency for each information source to be a recommendation candidate. In this regard, when each of the information sources is a type of information source that is edited by a user or an operator along with date and time information (such as a message board) the portal server 10 may calculate a difference between each item of date and time information so as to generate information regarding information addition frequency based on the calculated difference, and generate an information addition rate based on the amount of data of the edited portions. In this embodiment, the user device 14 also generates access frequency information, which indicates an access frequency to each information source.

Figure 7:
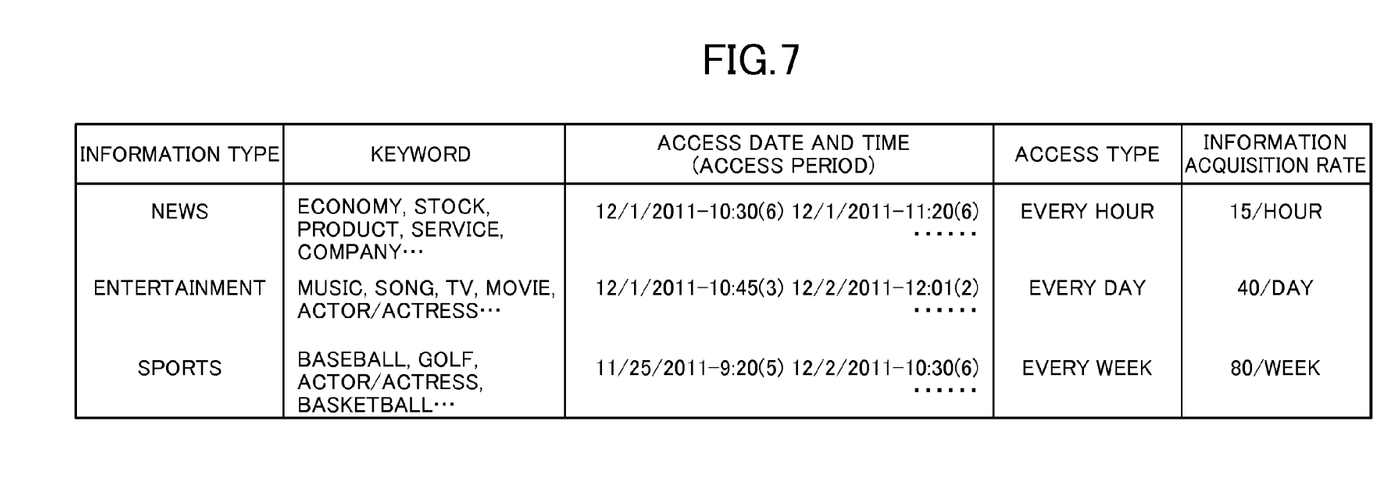
FIG. 7 is a diagram illustrating an example of an access management table stored in the user device.

FIG. 7 illustrates an access management table stored in the user devices 14. The access management table includes a keyword, access date and time, access period, access type, and information acquisition rate for each type of information.

The keyword is one or more words included in the information of the corresponding information type. As will be described later, HTML data including any of the keywords is determined to have been distributed from an information source of an information type corresponding to the keyword. In this regard, information types may be prioritized so that a higher priority information type may be determined as the information type of an information source when a plurality of keywords of information types are included in the HTML data received from the information source. Keywords may also be distributed from, for example, the portal server 10.

The access date and time is a date and time to start accessing HTML data that includes a keyword. The access period is a period from when access to the HTML data is started until access to HTML data that includes only a keyword of other information types is made, or until a web browser is closed.

The access type is determined based on the access date and time and the access period, and is one of the "every hour" "every day" and "every week" types. In particular, an average interval between each access date and time is calculated, and based on the calculated time, the access type is determined. For example, if an average interval is equal to or less than 20 minutes, the access type is determined to be an "every minute" type. If an average interval is more than 20 minutes and equal to or less than 15 hours, the access type is determined to be an "every hour" type. If an average interval is more than 15 hours and equal to or less than 3 days, the access type is determined to be an "every day" type. If an average interval is more than 3 days, the access type is determined to be an "every week" type. The access type indicates how frequently a user accesses each information source, and is one of the embodiments of access frequency information of the present invention.

The information acquisition rate is an average amount of information that a user of the user device 14 acquires in a minute, in an hour, in a day, or in a week (e.g., 1 given amount of information is 300 bytes and n given amounts of information is n×300 bytes).

The information acquisition rate is calculated based on the access date and time and the access period. Specifically, in a case where an access type is an "every minute" type, the information acquisition rate can be obtained by multiplying the average amount of information acquired in a minute by the information acquisition rate (e.g., 20 bytes/second) that is standard for the average access period (second) per minute.

In a case where an access type is an "every hour" type, the information acquisition rate can be obtained by multiplying the average amount of information acquired in an hour by the information acquisition rate (e.g., 20 bytes/second) that is standard for the average access period (second) per hour.

In a case where an access type is an "every day" type, the information acquisition rate can be obtained by multiplying the average amount of information acquired in a day by the information acquisition rate (e.g., 20 bytes/second) that is standard for the average access period (second) per day.

In a case where an access type is an "every week" type, the information acquisition rate can be obtained by multiplying the average amount of information acquired in a week by the information acquisition rate (e.g., 20 bytes/second) that is standard for the average access period (second) per week.

Figure 8:
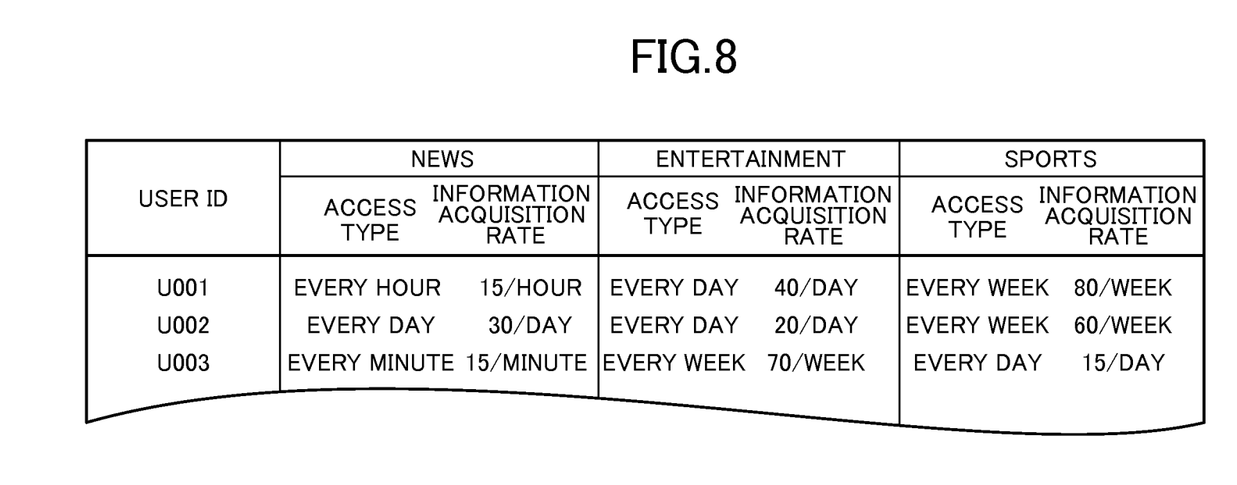
FIG. 8 is a diagram illustrating a user information table stored in the portal server.

In this way, an access type and an information acquisition rate for each information type in an access management table stored in each user device 14 are uploaded to the portal server 10, and as shown in FIG. 8, are stored in the portal server 10 for each user ID.

Figure 9:
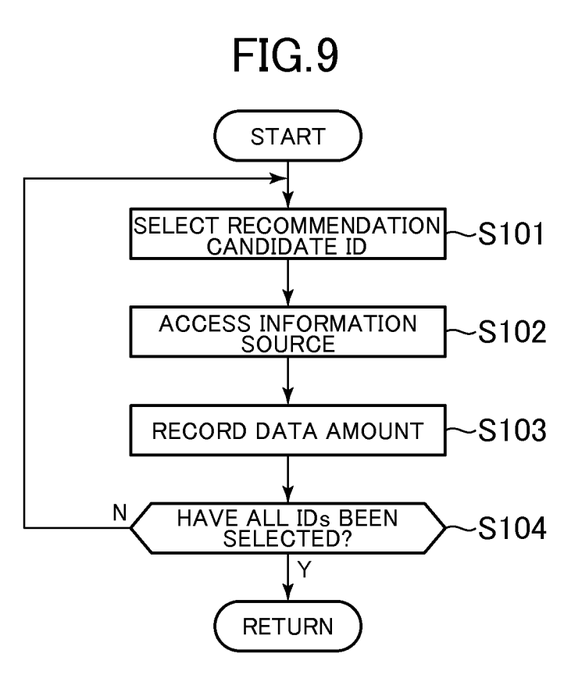
FIG. 9 is a flow chart of processing executed in the portal server for searching information sources.

FIG. 9 is a flow chart of processing executed in the portal server 10 for searching information sources. The processing shown in FIG. 9 is executed at predetermined intervals, for example, every minute. In the processing, one of the recommendation candidate IDs contained in the list of recommendation candidate information sources shown in FIG. 4 is selected, and a URL of the information source identified by the selected ID is readout from the list (S101). Subsequently, using the read-out URL, the portal server 10 accesses the information source, which is a recommendation candidate, to receive HTML data (S102). The portal server 10 then acquires a data amount of the received HTML data, and converts the data amount to a value of a predetermined scale (e.g., 300 megabytes=1 information given amount) to store converted data in a search result list (not shown) (S103).

The processing mentioned above is repeated while changing the recommendation candidate IDs (S101) until the processing in S102 and S103 is executed for all of the recommendation candidate IDs contained in the list of recommendation candidate information sources (S104). As a result of the foregoing processing, with respect to the information sources of all recommendation candidates, transitions of the amounts of data at the predetermined interval are stored in the search result list in the portal server 10.

Figure 10:
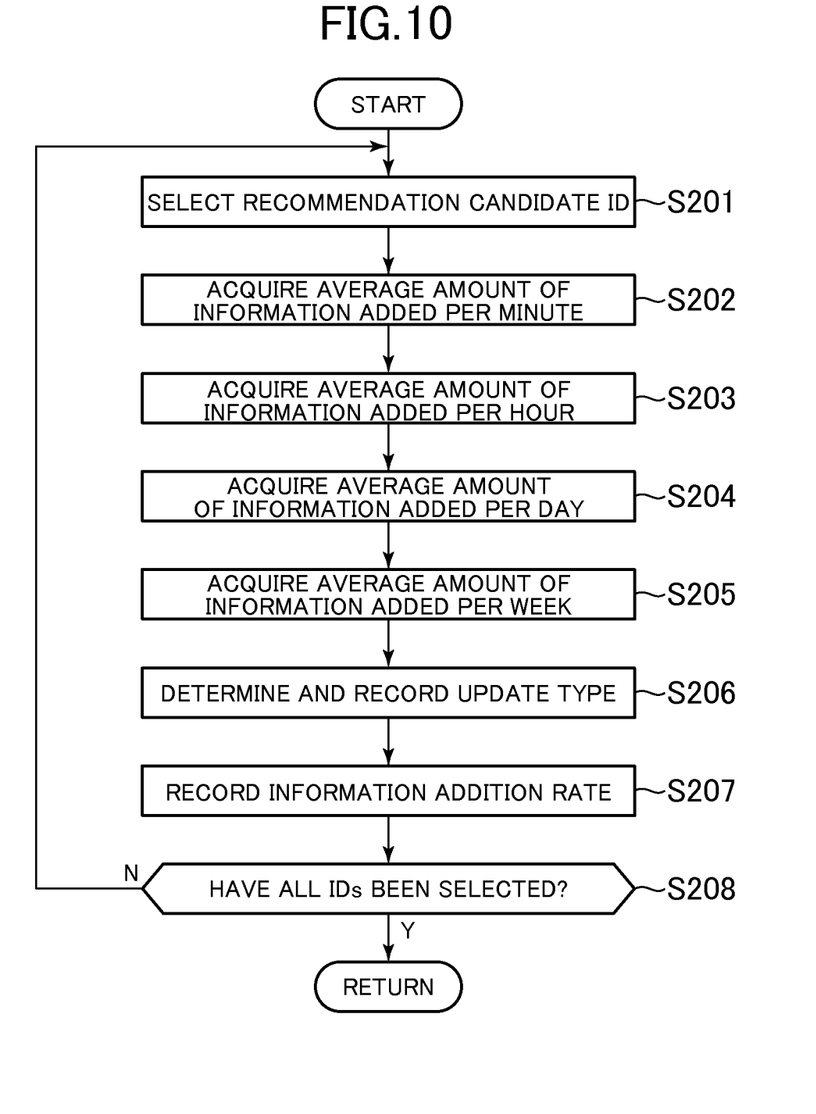
FIG. 10 is a flow chart of processing executed in the portal server for updating the information addition frequency table.

FIG. 10 is a flow chart of processing executed in the portal server 10 for updating the information addition frequency table. The processing shown in FIG. 10 is executed at predetermined intervals, for example, every month, to update the information addition frequency table shown in FIG. 6. In particular, the portal server 10 selects one of the recommendation candidate IDs contained in the list of recommendation candidate information sources shown in FIG. 4 (S201). Subsequently, the portal server 10 acquires, from the search result list generated in the processing of FIG. 9, changes of data amounts of the information source identified by the selected recommendation candidate ID. The portal server 10 then calculates an average value of the amount of data added per minute, and stores the calculated value in the information addition frequency table shown in FIG. 6 (S202). In a similar manner, the portal server 10 calculates average values of amounts of data added per hour, day, and week, respectively, and stores the calculated values in the information addition frequency table (S203, S204, and S205).

Subsequently in the manner discussed above, based on the value obtained in the processing of S202 through S205, the portal server 10 determines an update type of the information source identified by the ID selected in S201 (S206) and the information addition rate (S207). The portal server 10 then records the determined type and rate into the information addition frequency table. The processing mentioned above is repeated while changing recommendation candidate IDs (S201) until the processing of S202 through S207 is executed for all recommendation candidate IDs contained in the list of recommendation candidate information sources (S208). As a result of the foregoing processing, information on the information addition frequency table can be updated for the information sources of all recommendation candidates.

Figure 11:
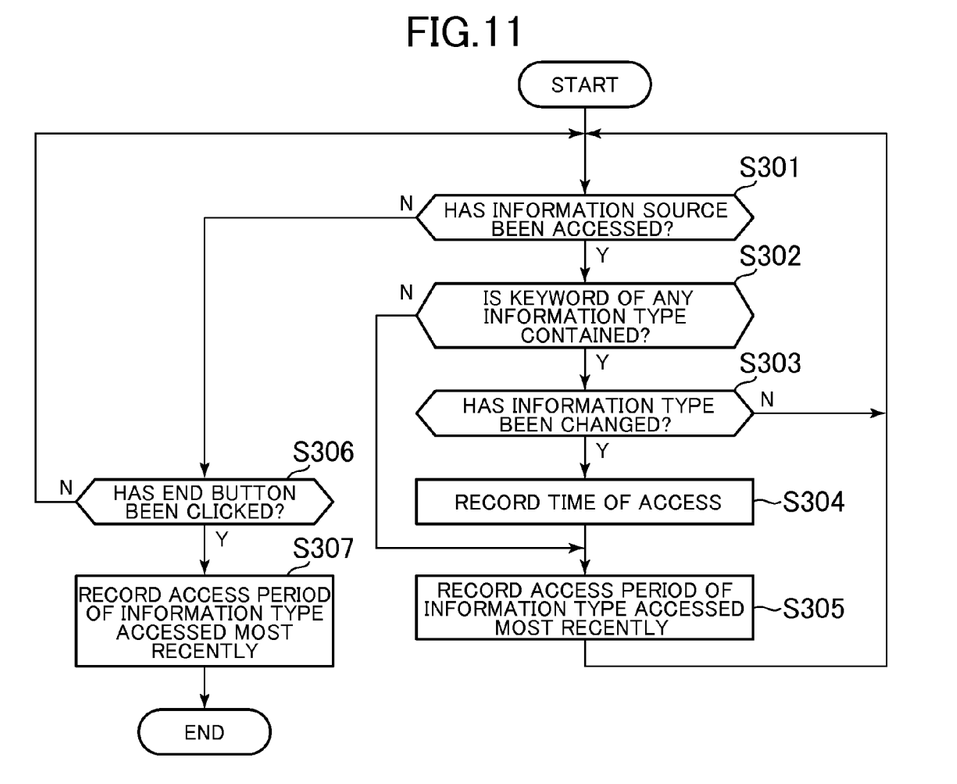
FIG. 11 is a flow chart of processing executed in the user device for recording the access management table.

FIG. 11 is a flow chart of processing executed in the user device 14 for recording the access management table. The user device 14 is installed with an access monitoring program, which starts access monitoring when a web browser is started on the user device 14. The processing shown in FIG. 11 is executed by the access monitoring program, which at first determines whether or not an information source is accessed by a web browser (S301). Specifically, it is determined whether or not any URL is entered in an input form and an enter key is pressed. If the information source has been accessed, then it is determined whether or not HTML data received from the information source contains a keyword of any information type (S302). The keyword of each information type is contained in the access management table shown in FIG. 7. If the keyword of any information type is contained, it is determined if the information type of the previously accessed information source is different from the information type of the currently accessed information source (S303). If it is not different, the program returns to the processing in step S301. If it is different, the program records the current time, as the time of the access, into the access management table shown in FIG. 7 (S304). Subsequently, the program records the access period of the information source of the information type that is most recently accessed into the access management table (S305), and returns to S301. The access period is a period from the time of accessing the information type, which is accessed most recently, to the current time recorded in the access management table in S304.

In S302, if a keyword of any information type is not contained in the received HTML data, the access monitoring program skips the processing in S303 and S304. If an information source of any information type has been accessed previously, the access period to the information source of the information type is recorded in the access management table (S305), and the program returns to S301.

In S301, if it is determined that the information source has not been accessed, then the program determines whether or not an end button has been clicked, e.g., the web browser has been closed (S306). If such an operation has been performed and an information source of any information type has been accessed previously, the program records the access period to the information source of the information type into the access management table (S307), and ends the processing. If such an operation has not been performed, the program returns to S301.

Figure 12:
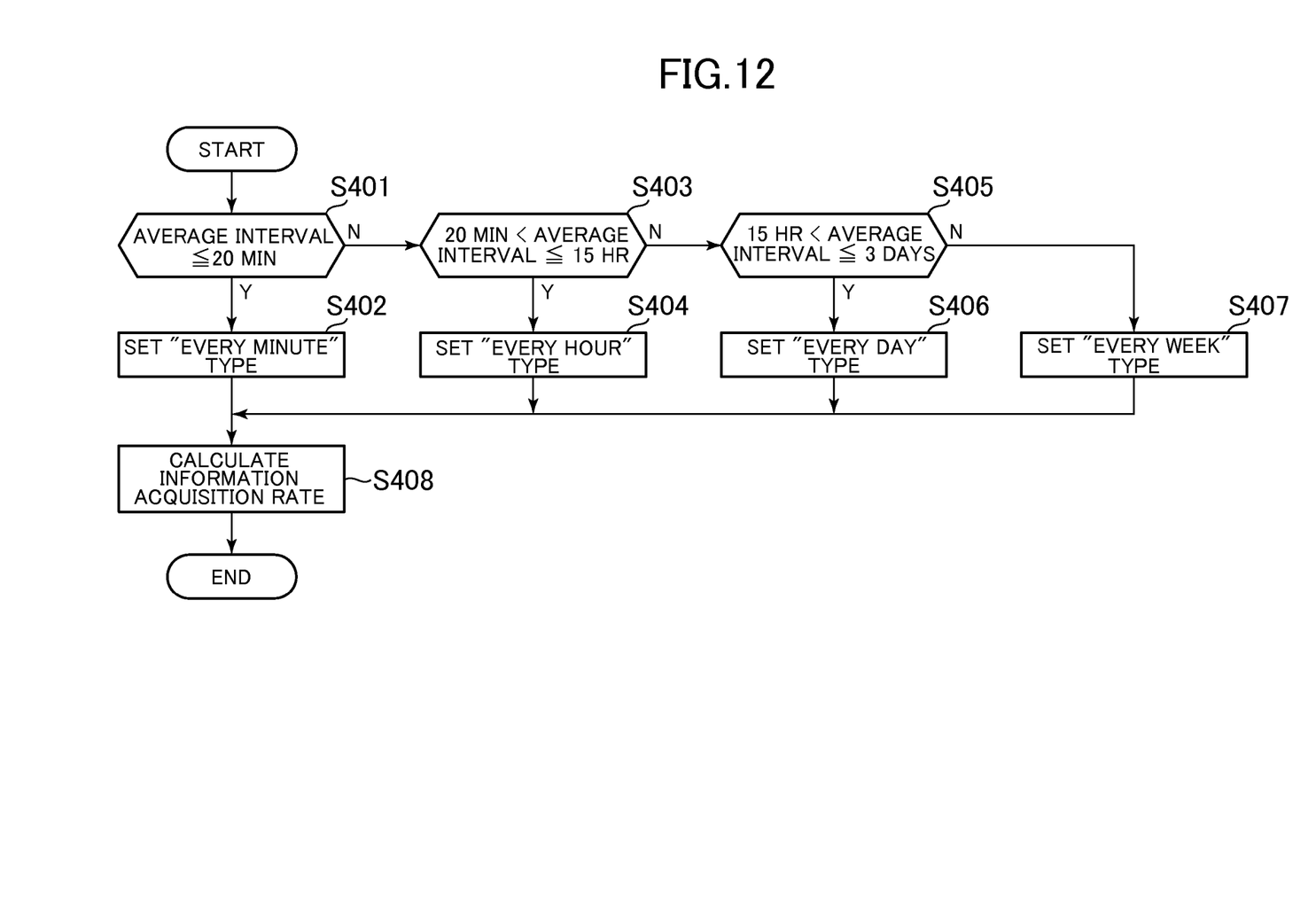
FIG. 12 is a flow chart of processing executed in the user device for determining an access type.

FIG. 12 is a flow chart of processing for determining an access type. The processing shown in FIG. 12 is executed in the user device 14 for each information type at predetermined intervals, for example, every month. In the processing, an access type is determined based on an access date and time contained in the access management table shown in FIG. 7.

First, an interval between each access date and time is calculated, and the average value of intervals is calculated. Subsequently, if the average interval is equal to or less than a predetermined first period of time, e.g., equal to or less than 20 minutes (S401), an access type is determined to be an "every minute" type and is recorded in the access management table (S402). If the average interval is more than the first period of time and equal to or less than a second period of time, e.g., equal to or less than 15 hours (S403), an access type is determined to be an "every hour" type and is recorded in the access management table (S404). If the average interval is more than the second period of time and equal to or less than a third period of time, e.g., equal to or less than three days (S405), an access type is determined to be an "every day" type and is recorded in the access management table (S406). If the average interval is more than the third period of time, the access type is recorded in the access management table as an "every week" type (S407). Thereafter, an information amount that a user acquires per unit of time corresponding to the determined access type is calculated, and is recorded in the access management table as an information acquisition rate (S408).

Figure 13:
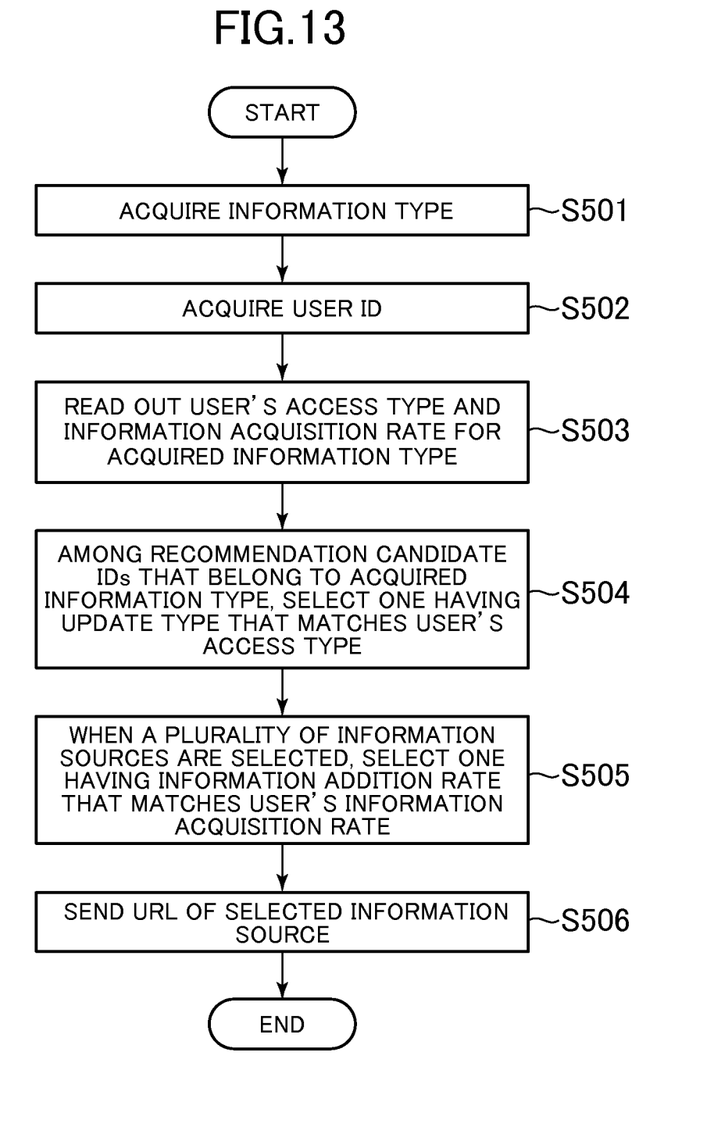
FIG. 13 is a flow chart of processing executed in the portal server for selecting an information source.

FIG. 13 is a flow chart of processing executed in the portal server 10 for selecting an information source. The processing is executed in the portal server 10 when a user selects one of the information type buttons 20*a* to 20*c* on the information type selection screen and data containing the selected content is sent to the portal server 10. As shown in FIG. 13, in the processing, the portal server 10 determines, based on data sent from the user device 14, if the user has selected one of the information type buttons 20*a* to 20*c* (S501).

Further, the portal server 10 acquires a user ID of the user who uses the user device 14 (S502). For example, the portal server 10 may acquire the user ID from data, such as a cookie, that is sent from the user device 14 together with data containing a selection of one of the information type buttons 20*a* to 20*c*. Then, in association with the acquired information type, the portal server 10 reads out an access type and an information acquisition rate contained in user information in FIG. 8 (S503).

Further, referring to the information addition frequency table shown in FIG. 6, the portal server 10 selects, from the information sources of the recommendation candidates of the acquired information type, an information source having an update type that matches the user (S504). For example, the portal server 10 may select an information source that has the same update type as the access type acquired in S503. If such an information source is not found, the portal server 10 may select an information source of the update type that is closest to the acquired access type. In S504, if a plurality of information sources are selected, the portal server 10 calculates differences between the information acquisition rates acquired in S503 and the information addition rates contained in the information addition frequency table shown in FIG. 6, and selects an information source having the smallest difference (S505). Subsequently, the portal server 10 reads out a URL of the selected information source from the list of recommendation candidate information sources shown in FIG. 4, and returns the URL to the user device 14 (S506).

As discussed above, according to the portal server 10 of this embodiment, a user is allowed to easily access an information source to which information is added at a frequency that matches the user's information acquisition frequency. This increases convenience for the user.

The present invention is not to be limited to the above described embodiment and can be changed as appropriate without departing from the spirit of the invention. For example, the user device 14 may download, from the portal server 10, a list of recommendation candidate information sources and each information source's update type and information addition rate in advance so as to select, in the user device 14, an information source that matches the user.

In the foregoing description, the portal server 10 returns the information type selection screen to the user device 14 and selects one of the information types in the user device 14 so as to select an information source, but an information source may be selected by any trigger.

For example, the present invention may be applied to a so-called Location-Based Service. In particular, the user device 14 may be configured as a portable device provided with positioning means or as a car navigation device so that, when the user device 14 approaches a certain location, information of the information source, which matches the user's information acquisition frequency and is selected from a plurality of information sources associated with the location, is sent to the user device 14. In this case, the user's information acquisition frequency is a frequency at which the user approaches the location. Information regarding the information source to which information is added at the frequency that matches this information acquisition frequency is sent to the user device 14.

Similarly, the present invention may be applicable to provide information by means of so-called AR (Augmented Reality). In particular, the user device 14 may be configured as a portable device provided with positioning means or as a car navigation device so that, when the user device 14 acquires an image of a certain location, information of the information source, which matches the user's information acquisition frequency and is selected from a plurality of information sources associated with the location, is sent to the user device 14. In this case, the user's information acquisition frequency is a frequency at which the user acquires an image of the location. Information of an information source to which information is added at the frequency that matches this information acquisition frequency is sent to the user device 14.

In the preceding discussion, the information server 16 functions as an information source. However the portal server 10 may function as an information source. In addition, in the preceding discussion, the present invention is applied to a web system. However, the present invention may, of course, be applied to other kinds of information providing systems.

While embodiments of the present disclosure have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An information source selection system comprising:
 a unit configured to acquire addition frequency information, which indicates a frequency at which information is added per predetermined time period to each of a plurality of recommendation candidate information sources among a plurality of information sources provided on a communication network, where the added information is not a result of a particular user's activities;

a unit configured to acquire access frequency information that indicates a frequency at which the particular user accesses one or more of the plurality of information sources;

a unit configured to select one or more of the recommendation candidate information sources that match the particular user based on the addition frequency information of each of the recommendation candidate information sources and the access frequency information of the particular user; and a unit configured to transmit identifiers of the selected one or more recommendation candidate information sources to the particular user over the communication network.

2. The information source selection system according to claim 1, wherein the access frequency information is acquired for each type of information accessed by the user, and wherein the one or more recommendation candidate information sources that match the user are selected from, based on the access frequency information that corresponds to a type of given information, the recommendation candidate information sources that provide the type of given information.

3. The information source selection system according to claim 1, further comprising:

a unit configured to acquire information on an amount of information that the user acquires per predetermined time period, wherein the one or more recommendation candidate information sources that match the user are selected based on the acquired amount of information.

4. The information source selection system according to claim 2, further comprising:

a unit configured to acquire information on an amount of information that the user acquires per predetermined time period, wherein the one or more recommendation candidate information sources that match the user are selected based on the acquired amount of information.

5. An information source selection method, comprising:

acquiring addition frequency information, which indicates a frequency at which information is added per predetermined time period to each of a plurality of recommendation candidate information sources among a plurality of information sources provided on a communication network, where the added information is not a result of a particular user's activities;

acquiring access frequency information that indicates a frequency at which the particular user accesses one or more of the plurality of information sources;

selecting one or more of the recommendation candidate information sources that match the particular user based on the addition frequency information of each of the recommendation candidate information sources and the access frequency information of the particular user; and transmitting identifiers of the selected one or more recommendation candidate information sources to the particular user over the communication network.

6. A non-transitory computer readable medium containing a program for causing a computer to:

acquire addition frequency information, which indicates a frequency at which information is added per predetermined time period to each of a plurality of recommendation candidate information sources among a plurality of information sources provided on a communication network, where the added information is not a result of a particular user's activities;

acquire access frequency information that indicates a frequency at which the particular user accesses one or more of the plurality of information sources;

select one or more of the recommendation candidate information sources that match the particular user based on the addition frequency information of each of the recommendation candidate information sources and the access frequency information of the particular user; and transmitting identifiers of the selected one or more recommendation candidate information sources to the particular user over the communication network.

7. A server, comprising:

a unit configured to acquire addition frequency information, which indicates a frequency at which information is added per predetermined time period to each of a plurality of recommendation candidate information sources among a plurality of information sources provided on a communication network, where the added information is not a result of a particular user's activities;

a unit configured to acquire access frequency information that indicates a frequency at which the particular user accesses one or more of the plurality of information sources;

a unit configured to select one or more of the recommendation candidate information sources that match the particular user based on the addition frequency information of each of the recommendation candidate information sources and the access frequency information of the particular user; and a unit configured to send information for identifying the selected one or more recommendation candidate information sources that match a frequency at which the particular user accesses one of the plurality of information sources on the communication network.

8. A user device, comprising:

a unit configured to acquire information for identifying, a selected one or more recommendation candidate information sources from a network server, the network server operating to: (i) acquire addition frequency information, which indicates a frequency at which information is added per predetermined time period to each of a plurality of recommendation candidate information sources among a plurality of information sources provided on a communication network, where the added information is not a result of a particular user's activities, (ii) acquire access frequency information that indicates a frequency at which the particular user accesses one or more of the plurality of information sources, and (iii) select the one or more of the recommendation candidate information sources that match the particular user based on the addition frequency information of each of the recommendation candidate information sources and the access frequency information of the particular user; and a unit configured to output information on the selected one or more recommendation candidate information sources based on the acquired information for identification.

* * * * *